US008024700B2

(12) United States Patent
Cantor et al.

(10) Patent No.: US 8,024,700 B2
(45) Date of Patent: Sep. 20, 2011

(54) METHOD AND SYSTEM FOR UNDERSTANDING SOCIAL ORGANIZATION IN A DESIGN AND DEVELOPMENT PROCESS

(75) Inventors: Murray R. Cantor, Westwood, MA (US); Sunita Chulani, San Jose, CA (US); Kate Ehrlich, Newton, MA (US); Mary E. Helander, North White Plains, NY (US); Giuseppe Valetto, New York, NY (US); Mark N. Wegman, Ossining, NY (US); Clay E. Williams, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 1149 days.

(21) Appl. No.: 11/750,763

(22) Filed: May 18, 2007

(65) Prior Publication Data

US 2008/0288632 A1 Nov. 20, 2008

(51) Int. Cl.
*G06F 9/44* (2006.01)
*G06F 9/45* (2006.01)
(52) U.S. Cl. .............. 717/104; 717/105; 717/120
(58) Field of Classification Search .......... 717/101–107, 717/120–125
See application file for complete search history.

(56) References Cited

U.S. PATENT DOCUMENTS

| | | | | |
|---|---|---|---|---|
| 5,875,330 | A * | 2/1999 | Goti ................................ | 717/104 |
| 6,285,999 | B1 | 9/2001 | Page | |
| 6,718,535 | B1 * | 4/2004 | Underwood .................. | 717/101 |
| 6,877,153 | B2 * | 4/2005 | Konnersman ................. | 717/100 |
| 6,961,910 | B2 * | 11/2005 | Lee et al. ....................... | 715/853 |
| 7,089,252 | B2 | 8/2006 | Tomlin et al. | |
| 7,185,204 | B2 * | 2/2007 | Narayanaswami et al. ... | 713/182 |
| 7,219,328 | B2 * | 5/2007 | Schloegel et al. ............. | 717/104 |
| 7,441,233 | B1 * | 10/2008 | Orndorff et al. .............. | 717/125 |
| 7,451,051 | B2 * | 11/2008 | Kratschmer et al. ........... | 702/83 |
| 7,451,453 | B1 * | 11/2008 | Evans et al. .................... | 719/318 |
| 7,644,390 | B2 * | 1/2010 | Khodabandehloo et al. . | 717/105 |
| 7,657,542 | B2 * | 2/2010 | Sundararajan et al. ....... | 707/792 |
| 7,716,149 | B2 * | 5/2010 | Ducheneaut et al. .......... | 706/45 |
| 7,716,573 | B2 * | 5/2010 | Schwartz ...................... | 715/234 |
| 7,735,062 | B2 * | 6/2010 | de Seabra e Melo et al. | 717/120 |
| 7,765,522 | B2 * | 7/2010 | Banavar et al. ................ | 717/105 |
| 7,793,258 | B2 * | 9/2010 | Sundararajan et al. ....... | 717/109 |
| 7,822,592 | B2 * | 10/2010 | Hawkins ........................ | 703/17 |
| 7,823,122 | B1 * | 10/2010 | Englehart ..................... | 717/106 |

(Continued)

OTHER PUBLICATIONS

Jiang et al, "Redefining social network services: a solution to personal information and knowledge management", IEEE, pp. 292-295, 2007.*

(Continued)

*Primary Examiner* — Anil Khatri
(74) *Attorney, Agent, or Firm* — Scully, Scott, Murphy & Presser, P.C.; Stephen C. Kaufman, Esq.

(57) ABSTRACT

A method and system constructs a socio-technical network representing design and development processes. In one aspect, a network of inter-personal interactions comprising at least a plurality of nodes representing actors in design and development process is established; an artifacts network comprising at least a plurality of nodes representing a plurality of heterogeneous artifact types is established; one or more relationships between the nodes in the network of inter-personal interactions are determined; one or more relationships between the nodes of the artifacts network are determined; and one or more relationships between the nodes in the network of inter-personal interactions and the nodes of the artifacts network are determined.

19 Claims, 5 Drawing Sheets

U.S. PATENT DOCUMENTS 7,831,693 B2 * 11/2010 Lai .................................. 709/220
7,844,951 B2 * 11/2010 Chen et al. .................... 717/124

OTHER PUBLICATIONS

Lindvall et al, "Searching for relevant software change artifacts using semantics networks", ACM SAC pp. 496-500, 2009.*

Scacchi, "Free/open source software development: Recent research results and emerging opportunities", ACM ESCE/FSE, pp. 459-468, 2007.*

Hansen, "Strings of experiments—Looking at the design process as a set of socio technical experiments", ACM, pp. 1-10, 2006.*

Cataldo, Marcelo et al., "Identification of Coordination Requirements: Implications for the Design of Collaboration and Awareness Tools", Proceedings of the Conference on Computer Supported Cooperative Work (CSCW'06), Nov. 4-8, 2006, Banff, Alberta, Canada.

Gotel, Orlena et al., "Contribution Structures", 1995.

De Souza, Cleidson et al., "From Technical Dependencies to Social Dependencies", 2004.

* cited by examiner

METHOD AND SYSTEM FOR UNDERSTANDING SOCIAL ORGANIZATION IN A DESIGN AND DEVELOPMENT PROCESS

CROSS-REFERENCE TO RELATED APPLICATIONS

This application is related to U.S. patent application Ser. No. 11/750,734, filed on May 18, 2007, entitled "A Method And System For Scoring And Ranking A Plurality Of Relationships In Components Of Socio-Technical System" having a common assignee, which application is incorporated by reference herein in its entirety.

FIELD OF THE INVENTION

The present application relates generally to socio-technical systems and, particularly to a method and system for understanding social organization in a design and development process.

BACKGROUND OF THE INVENTION

Any non-trivial design and development projects require the enactment of an intensely collaborative process, which makes such design and development an eminent socio-technical activity. For that reason, understanding and measuring how people are organized and interact with each other when they work on design and development projects and perform worker-intensive design activities is an important step in improving productivity of the design or development processes. Applicable projects may include but are not limited to software design and development project, hardware or system design and development projects.

In M. E. Conway, "How Do Committees invent?" Datamation, 14(4):28-31, April 1968, it has been observed that some form of correlation exists between the structure of a product and the layout of the organization that produces that product (Conway's Law).

D. L. Parnas, "On the Criteria to be Used in Decomposing Systems into Modules", Communications of the ACM, 15(12):1053-1058, December 1972, observed that in a software project the subdivision of development responsibility tends to influence and induce the modularization of the software product at least as strongly as functional decomposition.

Recently, a number of researchers have tried to investigate upon the aforementioned observations. The state of the art includes some works that employ techniques borrowed from Social Network Analysis (SNA) to plot visualizations and quantitatively measure properties of a network depicting the inter-personal interactions within an organization involved in the design and development of a software product. However the properties of such a network of inter-personal interactions seem insufficient to capture and explain the complex phenomena occurring in a software project, unless they are situated with respect to the technical work being done. For that reason a few other works couple SNA with general graph analysis capabilities, which are applied to a given representation of the software. For example, various works describe the networks obtained by carrying out inter-artifact relationships that can be obtained by performing static analysis of program code artifacts: see for example Cleidson de Souza et al., "From Technical Dependencies to Social Dependencies", 2004. Orlena Gotel et al., "Contribution Structures", 1995, instead, focus on the dependencies between requirement specification artifacts. Some others focus on the relationships between technical tasks carried out by people in the context of the software design and development process: see for example Marcelo Cataldo et al. "Identification of Coordination Requirements: Implications for the Design of Collaboration and Awareness Tools", Computer Supported cooperative Work '06, Nov. 4-8, 2006.

The existing works, however, take into account only one particular aspect of the multi-faced software design and development process, in connection with the organization undertaking it. Therefore, an improved methodology and a generic framework to aid the understanding of design and development is desirable. It would be also desirable that said methodology and framework take into consideration multiple relationships among a variety of diverse objects and entities involved in such design and development process.

BRIEF SUMMARY OF THE INVENTION

A method and system for constructing a socio-technical network representing design and development processes are provided. The method in one aspect may comprise establishing a network of inter-personal interactions comprising at least a plurality of nodes representing actors in design and development process, establishing an artifacts network comprising at least a plurality of nodes representing a plurality of heterogeneous artifact types, determining one or more relationships between the nodes in the network of inter-personal interactions, determining one or more relationships between the nodes of the artifacts network, and determining one or more relationships between the nodes in the network of inter-personal interactions and the nodes of the artifacts network.

A system for constructing a socio-technical network representing design and development processes, in one aspect, may comprise a processor operable to establish a network of inter-personal interactions comprising at least a plurality of nodes representing actors in design and development process, to establish an artifacts network comprising at least a plurality of nodes representing a plurality of heterogeneous artifact types, the processor further operable to determine one or more relationships between the nodes in the network of inter-personal interactions, one or more relationships between the nodes of the artifacts network, and one or more relationships between the nodes in the network of inter-personal interactions and the nodes of the artifacts network.

A program storage device readable by a machine, tangibly embodying a program of instructions executable by the machine to perform above-method steps for constructing a socio-technical network representing design and development processes is also provided.

Further features as well as the structure and operation of various embodiments are described in detail below with reference to the accompanying drawings. In the drawings, like reference numbers indicate identical or functionally similar elements.

DETAILED DESCRIPTION

A method and system of the present disclosure allows tools to be built that aid the understanding of a design and development project, for instance, by examining the issues that arise in the way people interact with each other in carrying out their work in a collaborative fashion. An example of a project is a software project. The following description applies the method and system of the present disclosure in the context of software design and development as an example. It should be understood, however, that the method and system of the present disclosure can be applied to any other project design and development, including but not limited to hardware, system, or any other project developments.

In one embodiment, the method and system follows from some well-known general reflections on software design and development as a socio-technical domain of human endeavor, and proposes a generic framework for the coherent representation and analysis of multiple concerns related to software design and development. In one embodiment, the method and system provides a graph (or "network") or like representation in which each concern is represented as a distinct plane (or "layer"). The method and system further enables the definition and computation of topological properties in that multi-layer representation, as well as their correlation with other properties of the software product and the software development process, which can be observed during the course of a project, for example, according to other methods known in the state of the art.

In one embodiment, a framework is defined and provided that supports the definition, analysis and visualization of the intricate web of relationships among people involved in design and development of a software product (also referred to as the software "stakeholders"), and between those stakeholders and other entities of consideration in a software design and development process, such as (Nut not limited to), software artifacts, software process activities, software development tools used to carry out those activities, etc. The method and system may employ means to draw and visualize inter-personal interactions, situated with respect to the variety of other aspects of the software design and development work carried out in a collaborative fashion by those people. In one embodiment, the representation of choice is a multi-layered graph (also referred to as "network"), in which entities considered in software design and development are represented together with their relationships. Such a network representation enables various forms of mathematical analysis (either upon a single layer, or across multiple layers), in order to discover or verify specific topological or statistical properties thereof, which are related to issues considered in a design and development project, for example, (but not limited to) productivity of the organization, quality of the design and/or the produced code, prediction and remedy of problematic areas in the resulting software products, etc.

Figure 5:
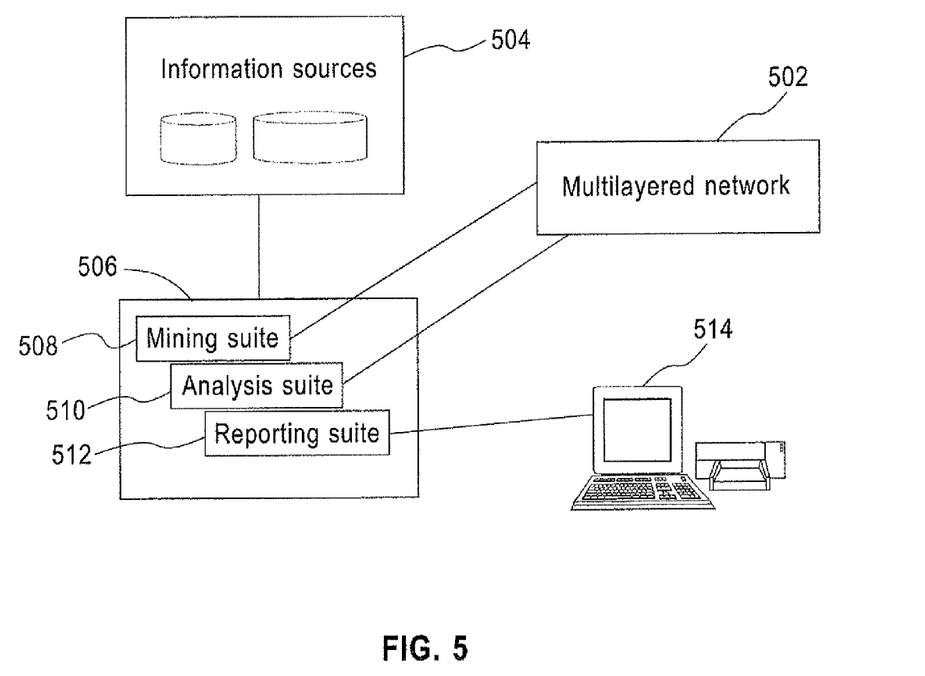
FIG. 5 is an architectural diagram illustrating the framework of the present disclosure in one embodiment.

FIG. 5 is an architectural diagram illustrating the framework of the present disclosure in one embodiment. A framework includes, but is not limited to: a multi-layered network representation 502 of entities, for example that are of significance or representative to the design and development process and their relationships; a set of information sources 504 which hold information on different types of data and about a project, from which said representation can be derived; a set of tools 506 for the extraction of information from said information sources, and its manipulation according to the network representation obtained. The set of tools may include, but is not limited to, a mining suite 508, an analysis suite 510, and a reporting suite 512. A mining suite 508 may include one or more tools for extracting raw information from said information sources 504, and creating nodes and arcs within the network representation 502. An analysis suite 510 may include one or more tools for analyzing the network representation 502, for example, with respect to its topological, statistical and otherwise mathematical properties. A reporting suite 512 may include one ore more tools to present to the users of the framework with views and reports on the results of the analysis, for example, on a user interface on a display, printing the report, or by any other presentation methods. This may include visualization tools that allow examining the network representation, or portions thereof The components of the framework may reside and execute in a computer system or a distributed network of computer systems.

Figure 1:
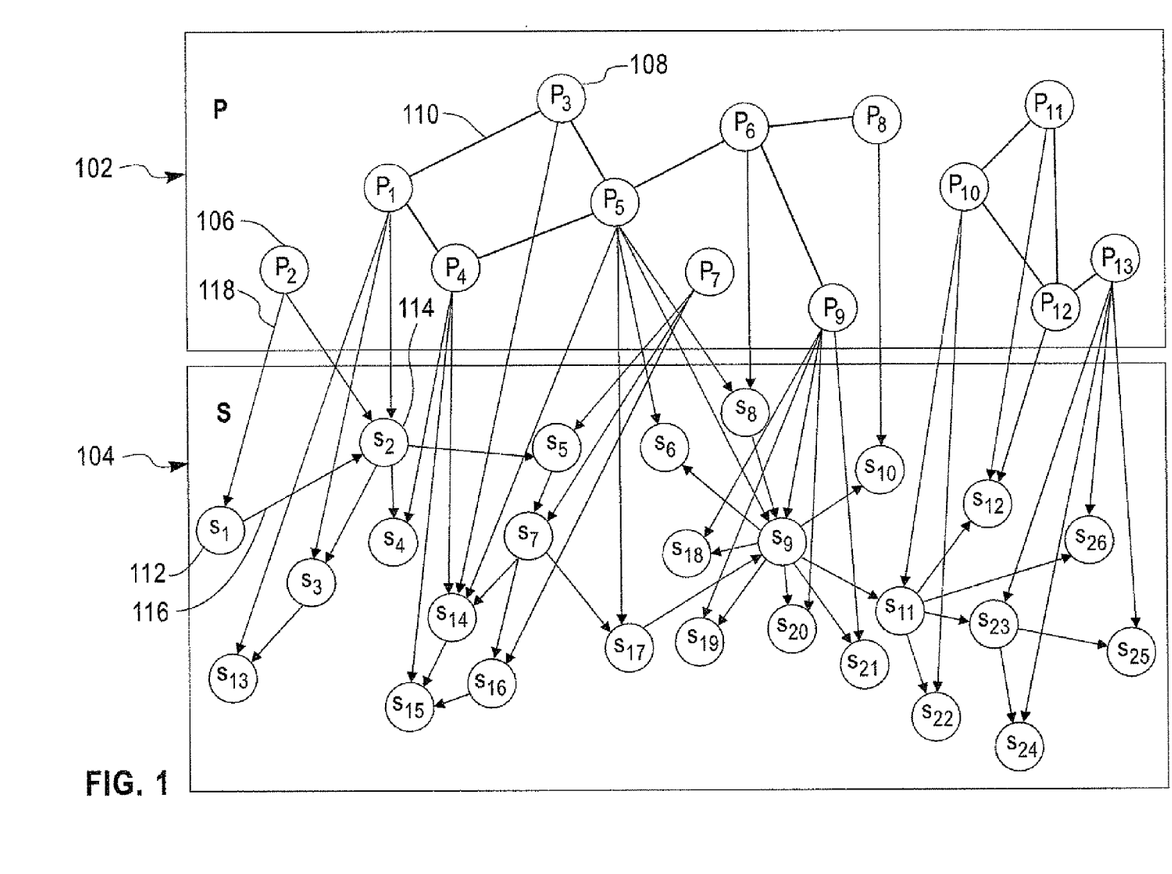
FIG. 1 illustrates an example of a two-layered network representing inter-personal relationships in one plane, inter-artifact relationships on another plane, and work relationships.

In one embodiment of a novel multi-layered network 502 according to the present disclosure, each layer contains a set of nodes, representing instances of some entity of interest to the design and development process. One of the layers is devoted to workers involved in the process (also known as stakeholders) and their relationships. FIG. 1 illustrates an example of a two-layered network (a network including two of the above-mentioned layers) representing inter-personal relationships, inter-artifact relationships and work relationships. Nodes (e.g., 106, 108, etc.) within a layer 102 are connected by arcs (e.g., 110, etc.), which represent relationships that are recognized between those entities. Thus, each plane or layer (e.g., 102, 104) in the network represents one distinct concern, with its nodes and arcs creating a sub-graph. Other arcs (also referred to as "joins"), e.g., 118, connect distinct layers (e.g., 102, 104), signifying relationships across different types of entities. Such joins provide means to relate multiple design and development concerns to each other and analyze them together. Nodes as well as arcs may have any number of attributes associated with them.

In one embodiment of the present disclosure, information sources 504 may include data contained in repositories commonly employed within a software design and development process, such as (but not limited to) Software Configuration Management systems (SCMs), Mailing List servers, change request and bug tracking databases, and more. A mining suite 508 in the present disclosure may query those repositories with a variety of appropriate tools, which extract information according to the data format specific to each repository, and produce nodes and arcs in a common output data format for the purposes of constructing and representing the multi-layered network.

One or more tools in the analysis suite 510 may access the data representing the multi-layered network, for example, output by the mining suite in the format recognizable by the analysis suite, and perform a variety of analyses on the network. One or more tools in the reporting suite 512 may visualize the results of the analyses as well as the network itself, and significant portions thereof, as per the results of the analyses.

The method and system of the present disclosure enables to take into account a rich set of concerns that influence and shape the network of inter-personal interactions among workers, and the functioning of the overall design and development organization, for example, by allowing to include in a multi-layer graph representation entities such as process activities, development tools in use, etc.

The set of selected information sources and the set of the extraction tools included in the mining suite together determine the number of layers and the kind of information represented in the multi-layered network. For example, in a two-layered network like that represented in FIG. 1, the layers considered in the network may represent software stakeholders and software artifacts, which yield a two-layered network, with a People (P) and a Software (S) layer. The arcs within the P layer may represent for instance communication acts between software stakeholders, while arcs within the S layer may represent for instance traceability relationships among development artifacts. Traceability relationships express how an artifact "derives" from another, or others, through the development process activities that manipulate those artifacts.

There are also arcs connecting the two layers in such a two-layered network, which may represent "work relationships". When a person Pa has done some work on some artifact Sb, that is represented in the network by an arc connecting Pa to Sb. Such a network layout enables to consider how inter-personal communication is situated with respect to work done, and how those two dimensions correlate.

Notice how according to the concerns of interests selected above, the software artifacts represented, for example, in S layer 104, include diverse kinds of artifacts: program code artifacts, as well as "non-code" artifacts such as requirements, test cases, architectural design diagrams, problem reports, etc.; similarly, the relationships among those artifacts signify diverse kinds of traceability, that is, ways in which one or more artifact of one kind is derived from one or more artifacts of different kinds. By employing, within a two-layered network like the one described above, artifacts and relationships of different kinds, which are the by-product of different phases within the software development life cycle, the method and system of the present disclosure enables the possibility of socio-technical analysis of software projects well beyond what is described in the current state of the art, which is limited to the coding and maintenance phases. The method and system of the present disclosure also offer insights that are applicable to all phases in the design and development process.

Such a two-layered network representation can be extracted by mining, for example, an SCM system. Examples of SCM systems include Concurrent Version System (CVS), Subversion (also known as SVN), ClearCase, and many others. These systems store traces of artifacts involved in the production of software. They almost always contain traces of source code, but often also of requirement documents, architectural and other design artifacts, test cases, etc. An SCM system enables people to take an existing artifact and produce a new version, typically keeping track of the changes and of the identity of the changes' authors, with the main purpose of being able to recreate earlier versions. From an SCM system it is possible to extract enough information to instantiate nodes in the P and S layers, and to draw work relationship arcs between P and S.

A two-layered network representation can be extracted also by mining, for example, one or more repositories tracing inter-personal communications between stakeholders. Non-exhaustive examples of known repositories used for Social Network Analysis include email servers, bulletin boards, newsgroups, mailing list, instant messaging servers, calendar tools, meeting support tools, etc. Such information may be used to draw arcs in the P plane.

A two-layered network representation can be extracted also by mining, for example, repositories which contain traces of software development activities performed by stakeholders within a process of interest. Those traces allow extracting of information about the production and derivation of artifacts according to the process, which can be used to draw arcs for traceability relationships in the S plane. The known state of the art includes requirements management repositories, change request repositories, and other process-aware repositories, which can all be used for this purpose.

Once a two-layered network representation such as the one described above is established, it can enable a variety of analyses related to the socio-technical nature of the design and development process and product it captures.

Example application #1: An example of an analysis enabled by this particular network is a comparison between the social distance between person nodes in plane P and the "derivation distance" between artifacts in plane S upon which those persons have been working. The analysis can be used to see whether the communication structure in the organization represented in plane P is adequate to support the production of related, i.e., derived artifacts. For example, a long social distance between 2 stakeholders involved in producing 2 different artifacts, which directly derive from one another, may be a symptom of inadequate communication and/or suboptimal organization of work within the design and development organization.

Example application #2: The method and system in one embodiment also may enable a process of derivation of the "expected" network of inter-personal interactions (P plane) of the organization involved in the design and development process, from the examination of the relationships existing in the other planes taken into consideration. For example, in the case of a two-layered network shown in FIG. 1, the expected network of inter-personal interactions can be derived from the relationships between software artifacts (S plane), plus the recorded change and/or access history for those software artifacts by the people involved in their development (i.e., the join arcs between P and S planes). The process for deriving the expected network of inter-personal interactions takes into consideration that work on related artifacts by different persons is likely to require some form of interaction among the involved stakeholders. Therefore, it can proceed by "projecting" onto the P plane inter-artifact relationships existing on the S plane, using for projection the work relationships that connect those artifacts to the involved stakeholders. Those projected relationship on the P plane constitute the expected network of inter-personal interactions, which can be compared with the "actual" network of inter-personal interactions, whenever independent information about actual inter-personal coordination and communication can be mined as well. That comparison can be used for example to unveil lack of essential work interactions among members of the design and development organization.

Figure 2:
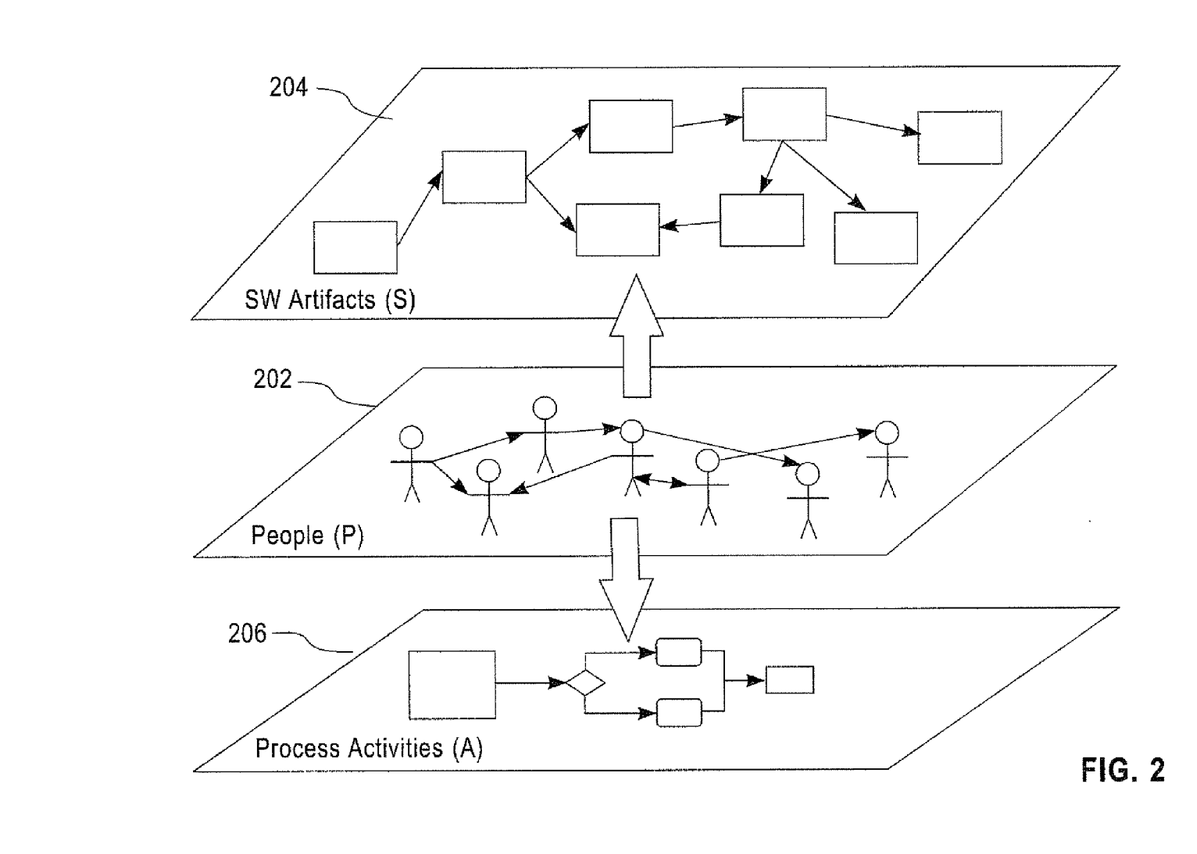
FIG. 2 illustrates an example representation of a three-layered network, for example, taking into account inter-personal relationships, artifact relationships and process activities.

While FIG. 1 illustrates a 2-layered network, a network of the present disclosure may have any number of additional layers, as well as of joins sets connecting those layers. In a different example, shown in FIG. 2, three layers are represented in the network: stakeholders (P layer) 202, artifacts (S layer) 204, and activities carried out during the development process (an additional A layer) 206. With respect to the previous example, the introduction of the process concern layer enables representing within the A layer 206 the relationships between different activities in the process such as the control flow between those activities. Moreover, the method and system of the present disclosure can establish relationships between the A layer 206 and the S layer 204 (such as the data flow from and/or to activities) and between the A layer 206 and the P layer 202 (such as the assignment of activity responsibility to stakeholders), by using opportune joins. Such a three-layered network can make evident how the association between people and artifacts is explicated by the responsibilities they take in the project and the work activities they carry out throughout the process.

Example application #3: The analysis over such a three-layered network can, for example, explore the amount of work carried out on a given artifact, broken down by the kind of activity performed and the persons who actually take up those activities.

Example application #4: Another analysis can observe the amount of re-work incurred by an artifact, or set thereof during the development process, which can be expressed by the repetition of a specific activity, or series of activities, by certain persons or groups, which result in the modification of the same set of artifacts.

Figure 3:
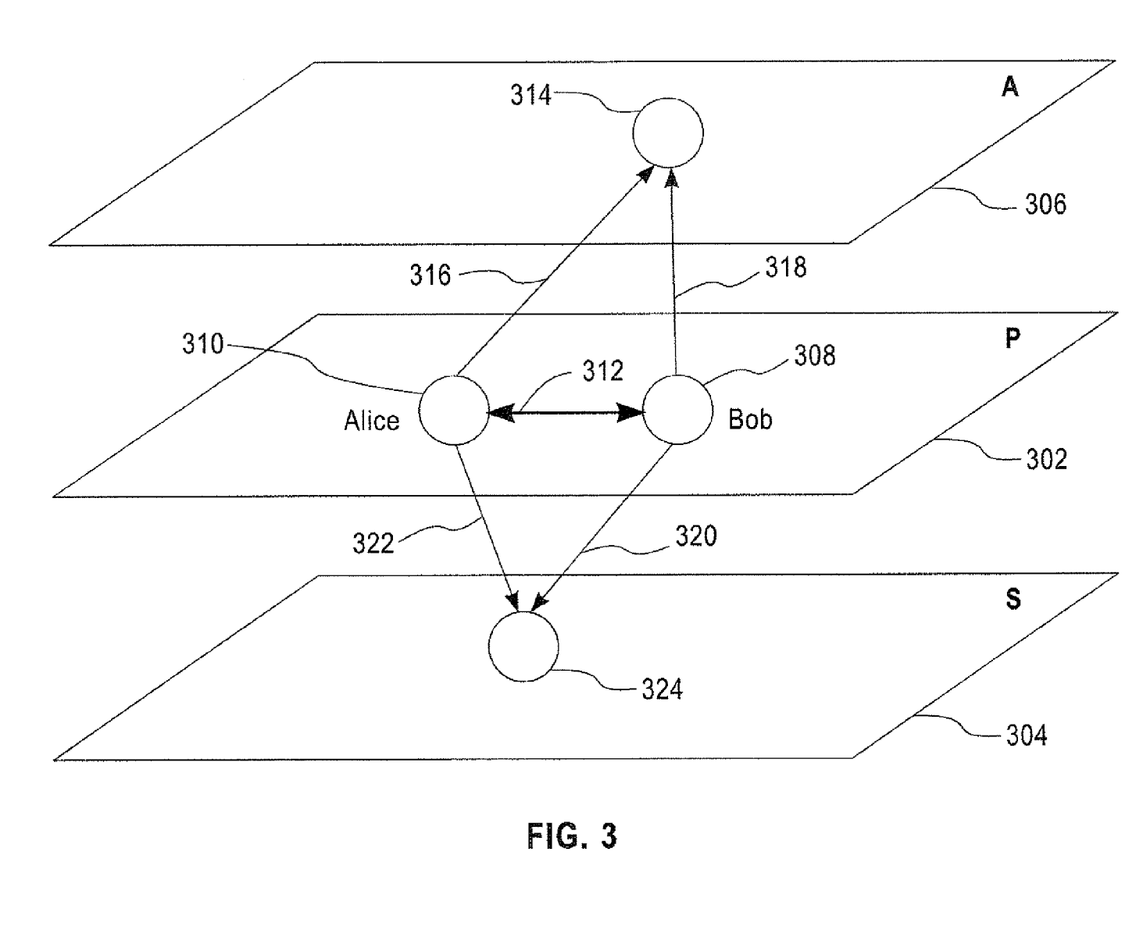
FIG. 3 illustrates an example of a pattern within a three-layered network having arcs and nodes representing inter-personal relationships, artifact relationships and process activities.
Figure 4:
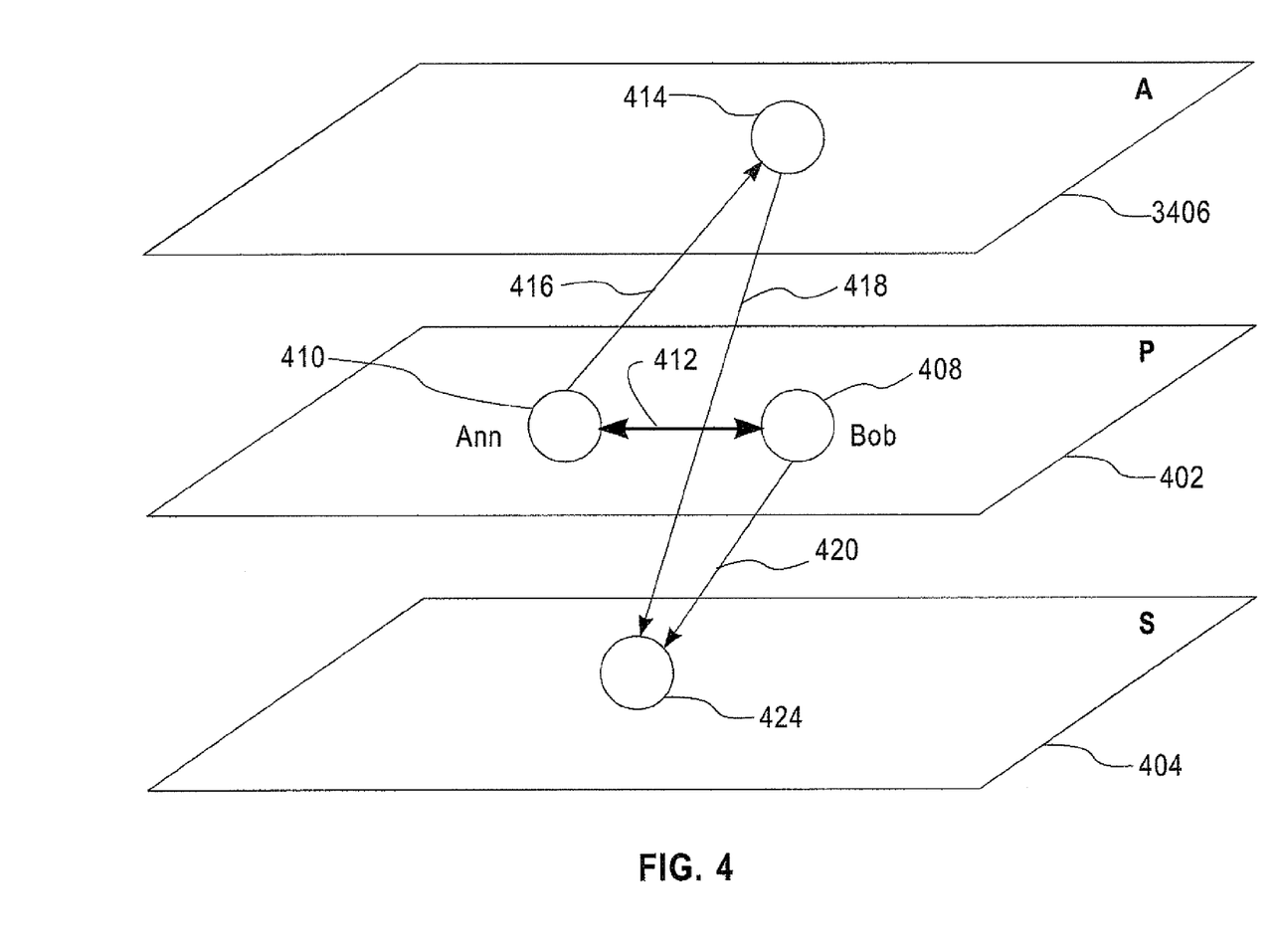
FIG. 4 illustrates another example of a pattern within a three-layered network having arcs and nodes representing inter-personal relationships, artifact relationships and process activities.

FIGS. 3 and 4 illustrate portions of such a three-layered network, showing different patterns of relationships among the nodes in the three layers. FIG. 3 shows a pattern including an interpersonal relationship 312 between two stakeholders (Bob and Alice), represented by nodes 308, 310 in the P layer. In addition, the pattern includes relationships 316, 318 between those nodes in the P layer and a node 312 in the activities (A) layer 306, representing a development and design activity carried out by both stakeholder. According to this pattern, the nodes 308, 310 in the P layer further have relationships 320, 322 with a node 324 in the S layer 304 representing a software artifact jointly worked upon by the same stakeholders. The network pattern represented in FIG. 3 captures a situation in the design and development process in which stakeholders Alice and Bob have jointly worked on some activity 314 within the process; they have also both worked upon a software artifact 324. Note that while this pattern does not explicitly shows a relationship between activity 314 and artifact 324 (for example, activity 314 has produced or modified artifact 324), it could be used in an analysis, for example to infer exactly such a scenario. Hence, this pattern can be used to explore and (re-)construct instances of joint work between stakeholders, situated within a given process activity and for a given artifact.

FIG. 4 shows another pattern in the same three-layered network. It includes stakeholder Bob and Ann, represented by nodes 408 and node 410, which are associated by interpersonal relationship 412 in P layer 402. Node 410 is also associated in this pattern by relationship 416 with a process activity represented by node 414 in A layer 406, while node 408 is linked through relationship 420 to an artifact represented by node 424 in S layer 404. This pattern further includes a relationship between process activity 414 and artifact 424. The network pattern represented in FIG. 3 captures a situation in which there is a direct relationship between a process activity and an artifact involved in that activity, and two different stakeholders are differently related to the activity and artifact. The pattern can for example indicate that stakeholder 410 assigned activity 414 to stakeholder 408, which resulted in stakeholder 408 producing artifact 424.

The patterns displayed in FIGS. 3 and 4 illustrate different scenarios in which there is at least one link (or relationship) established from an element (or node) from each of the two or more networks and an element in the network of inter-personal interactions. That is, every network is linked to the network of inter-personal interactions by at least one link, and the network of inter-personal interactions remains part of the analyses of those patterns. Patterns such as these and others not shown herein may be used in topological, statistic or otherwise mathematic analysis of the network, which can lead to a detailed and quantitative understanding of the unfolding of the design and development process.

Another example use of these networks is establishing correlation of the measures deriving from the quantitative analyses that can be carried out on them, for example, as per (but not limited to) the examples provided, with other measures relative to the project, for example, software process and product, which can be obtained independently with other means, which are well known in the state of the art. Examples of those other measures include measures indicating software quality properties, such as (but not limited to) defect density, complexity of design and code, fault frequency, etc.; other examples may include measures indicating the efficiency and productivity of the design and development process, such as (but not limited to) turnaround time for the implementation of a work item that is part of the process, amount of re-work within the process, timeliness of completion of the process or parts thereof, etc. Achieving a statistically significant correlation, for example, determined as a predefined threshold, between network measures and those other measures allows to consider network measures as proxies of properties such as (but not limited to) quality, productivity etc. That in turn enables the prediction of those other properties on the basis of the analysis on the correlated aspects of the socio-technical networks that can be constructed as explained in the present disclosure.

Example application #5: the amount of inter-personal communication between elements in the team whose work is prevalently directed to the development of separate but interdependent components of the final product can be for example correlated to the amount of effort necessary to integrate those separate components into the final product. If a statistically significant inverse correlation between those two measures is found, that may mean that less communication could be conducive to heavier integration effort, and a lack of communication observed in the socio-technical network during development of the artifacts that make up the inter-dependent components can be used to predict that the integration work later on may become particularly difficult and/or effort-intensive.

The system and method of the present disclosure may be implemented and run on a general-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server.

The embodiments described above are illustrative examples and it should not be construed that the present invention is limited to these particular embodiments. For instance, the method and system of the present disclosure can be applied to design and development of project other than software. Thus, various changes and modifications may be effected by one skilled in the art without departing from the spirit or scope of the invention as defined in the appended claims.

We claim:

1. A method for constructing a socio-technical network representing design and development processes, comprising:
   establishing a network of inter-personal interactions comprising at least a plurality of nodes representing actors in design and development process;
   establishing an artifacts network comprising at least a plurality of nodes representing a plurality of heterogeneous artifact types;
   determining, by a processor, one or more relationships between the nodes of the network of inter-personal interactions, representing communication acts between said actors;
   determining one or more relationships between the nodes of the artifacts network, representing traceability relationships expressing how an artifact derives from another;
   determining one or more relationships between the nodes of the network of inter-personal interactions and the nodes of the artifacts network, representing work relationships specifying which actor has worked on which artifact type; and
   graphically visualizing said network of inter-personal interactions with said one or more relationships between the nodes of the network of inter-personal interactions on a first plane, said artifacts network with said one or more relationships between the nodes of the artifacts networks on a second plane, and said one or more relationships between the nodes of the network of inter-personal interactions and the nodes of the artifacts network; correlating results of said analyzing step with one or more measurements associated with a project identified in said design and development process, said correlating enabling prediction of one or more properties associated with said design and development process.

2. The method of claim 1, further including:
   establishing one or more third networks, at least one of the third networks comprising at least a plurality of nodes associated with activities performed in said design and development.

3. The method of claim 2, further including:
   determining at least one relationship between a node in the network of inter-personal interactions and a node in each of said one or more third networks; and
   graphically visualizing said one or more third networks on respective one or more third planes and said at least one relationship between a node in the network of inter-personal interactions and a node in each of said one or more third networks.

4. The method of claim 1, further including:
   determining one or more properties of at least one of said network of inter-personal interactions and said artifacts network using said one or more relationships between the nodes of the network of inter-personal interactions and the nodes of the artifacts network.

5. The method of claim 4, further including:
   comparing an actual network of inter-personal interactions with an expected network of inter-personal interactions generated using said one or more properties.

6. The method of claim 1, wherein said plurality of nodes representing actors in design and development process and said plurality of nodes representing a plurality of heterogeneous artifact types includes attributes associated with at least one of software, hardware, services, and artifacts from different phases of production stages of software, hardware and services.

7. The method of claim 1, wherein said steps of establishing and determining include extracting information from one or more sources of information associated with design and development of a product.

8. The method of claim 1, further including analyzing said one or more relationships contained in said socio-technical network built using said steps of establishing and determining.

9. The method of claim 8, further including:
   reporting results of said analyzing step.

10. The method of claim 8, wherein said one or more measurements are derived independent of said analyzing step.

11. The method of claim 1, wherein said methods steps are provided as a service.

12. A system for constructing a socio-technical network representing design and development processes, comprising:
   a processor operable to establish a network of inter-personal interactions comprising at least a plurality of nodes representing actors in design and development process, to establish an artifacts network comprising at least a plurality of nodes representing a plurality of heterogeneous artifact types, the processor further operable to determine one or more relationships between the nodes of the network of inter-personal interactions representing communication acts between said actors, one or more relationships between the nodes of the artifacts network representing traceability relationships expressing how an artifact derives from another, and one or more relationships between the nodes of the network of inter-personal interactions and the nodes of the artifacts network representing work relationships specifying which actor has worked on which artifact type,
   the processor further operable to graphically visualize said network of inter-personal interactions with said one or more relationships between the nodes of the network of inter-personal interactions on a first plane, said artifacts network with said one or more relationships between the nodes of the artifacts networks on a second plane, and said one or more relationships between the nodes of the network of inter-personal interactions and the nodes of the artifacts network; correlating results of said analyzing step with one or more measurements associated with a project identified in said design and development process, said correlating enabling prediction of one or more properties associated with said design and development process.

13. The system of claim 12, wherein the processor is further operable to establish one or more third networks, at least one of the third networks comprising at least a plurality of nodes associated with activities performed in said design and development.

14. The system of claim 12, wherein the processor includes:
   means for extracting information from one or more sources to establish said network of inter-personal interactions and said artifacts network, and for building relationships among a plurality of nodes within and across said network of inter-personal interactions and said artifacts network.

15. The system of claim 14, wherein the processor further includes:
   means for analyzing said nodes and relationships.

16. The system of claim 15, wherein the processor further includes:

means for reporting results of said analyzing.

17. A program storage device readable by a machine, tangibly embodying a program of instructions executable by the machine to perform a method for constructing a socio-technical network representing design and development processes, comprising:

establishing a network of inter-personal interactions comprising at least a plurality of nodes representing actors in design and development process;

establishing an artifacts network comprising at least a plurality of nodes representing a plurality of heterogeneous artifact types;

determining, by a processor, one or more relationships between the nodes of the network of inter-personal interactions, representing communication acts between said actors;

determining one or more relationships between the nodes of the artifacts network, representing traceability relationships expressing how an artifact derives from another;

determining one or more relationships between the nodes of the network of inter-personal interactions and the nodes of the artifacts network, representing work relationships specifying which actor has worked on which artifact type; and graphically visualizing said network of inter-personal interactions with said one or more relationships between the nodes of the network of inter-personal interactions on a first plane, said artifacts network with said one or more relationships between the nodes of the artifacts networks on a second plane, and said one or more relationships between the nodes of the network of inter-personal interactions and the nodes of the artifacts network; correlating results of said analyzing step with one or more measurements associated with a project identified in said design and development process, said correlating enabling prediction of one or more properties associated with said design and development process.

18. The program storage device of claim 16, further including:

establishing one or more third networks, at least one of the third networks comprising at least a plurality of nodes representing activities performed associated with said design and development.

19. The program storage device of claim 18, further including:

determining at least one relationship between a node in the network of inter-personal interactions and a node in each of said one or more third networks; and graphically visualizing said one or more third networks on respective one or more third planes and said at least one relationship between a node in the network of inter-personal interactions and a node in each of said one or more third networks.

* * * * *